J. B. COOK & J. W. HEATH.
Prisons.
No. 154,021 Patented Aug. 11, 1874.
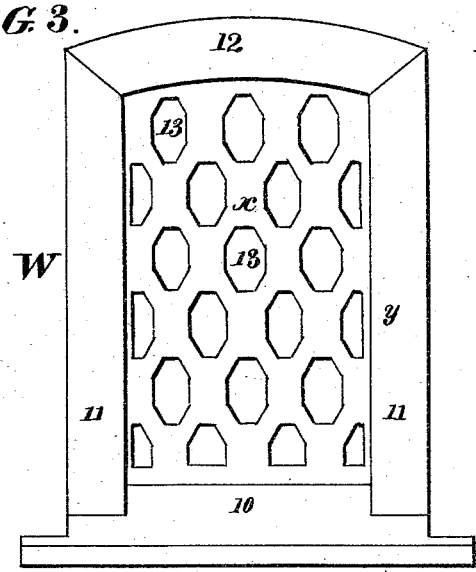
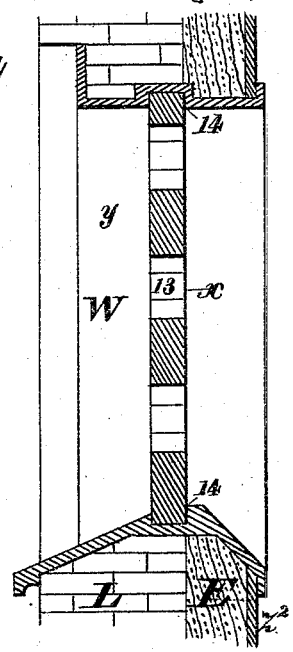
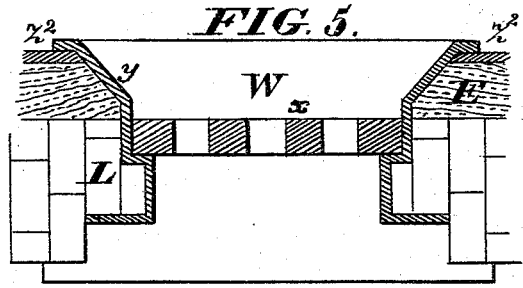
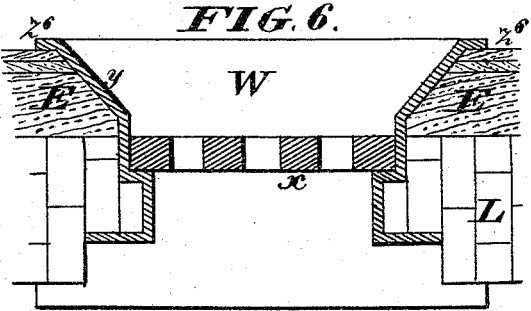
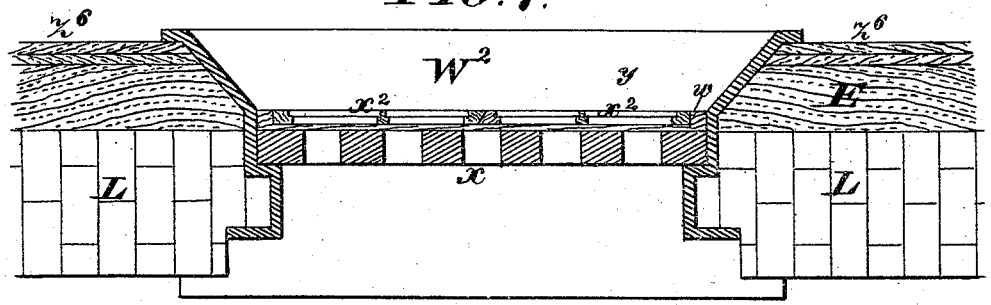
WITNESSES
Jas. L. Ewin.
Walter Allen.
INVENTORS.
James Bartholomew Cook.
James Wilson Heath.
By Kinghestra Attorneys J. B. COOK & J. W. HEATH.
Prisons.
No. 154,021.
4 Sheets--Sheet 4.
Patented Aug. 11, 1874.
FIG. 8.
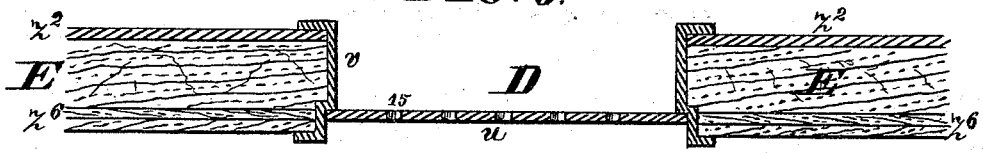
FIG. 9.
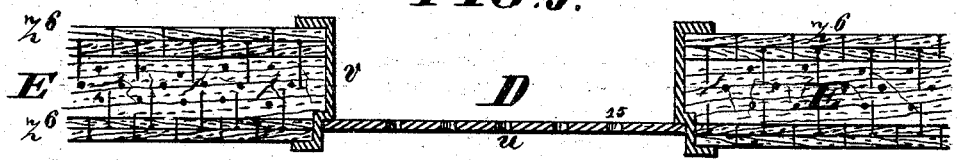
FIG. 10.    FIG. 13.    FIG. 14.
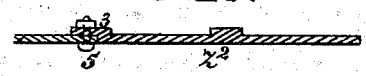 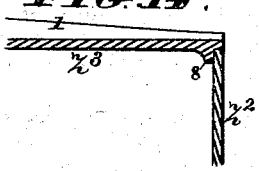
FIG. 11.
FIG. 12.    FIG. 15.
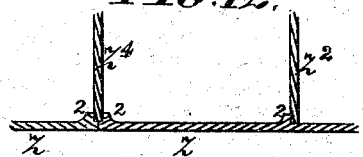 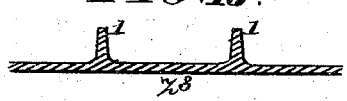
WITNESSES
Jas. L. Ewin.
Walter Allen.
INVENTORS.
James Bartholomew Cook.
James Wilson Heath.
By Knight Bro. Attorneys ated August 11, 1874; application filed
UNITED STATES PATENT OFFICE.

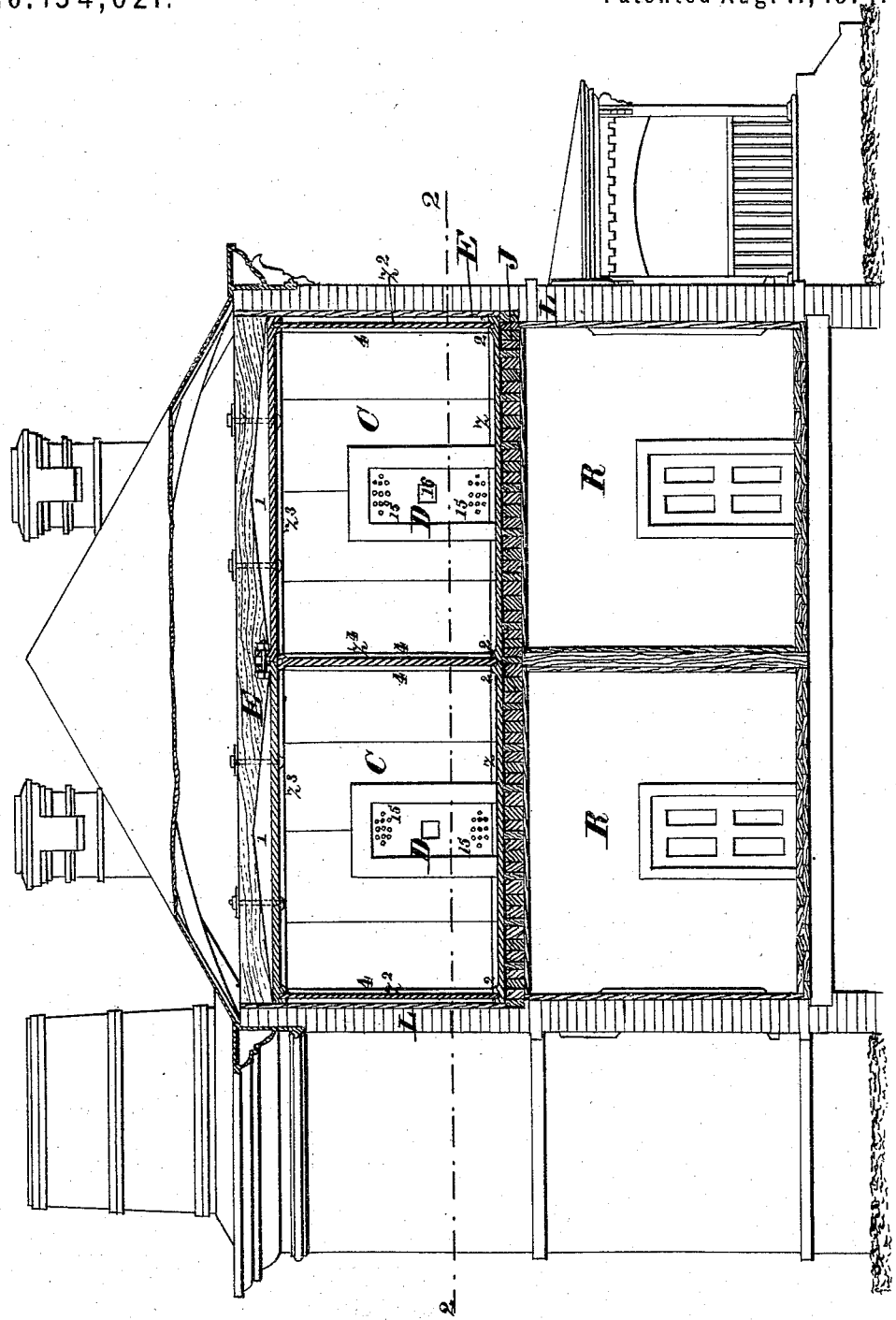

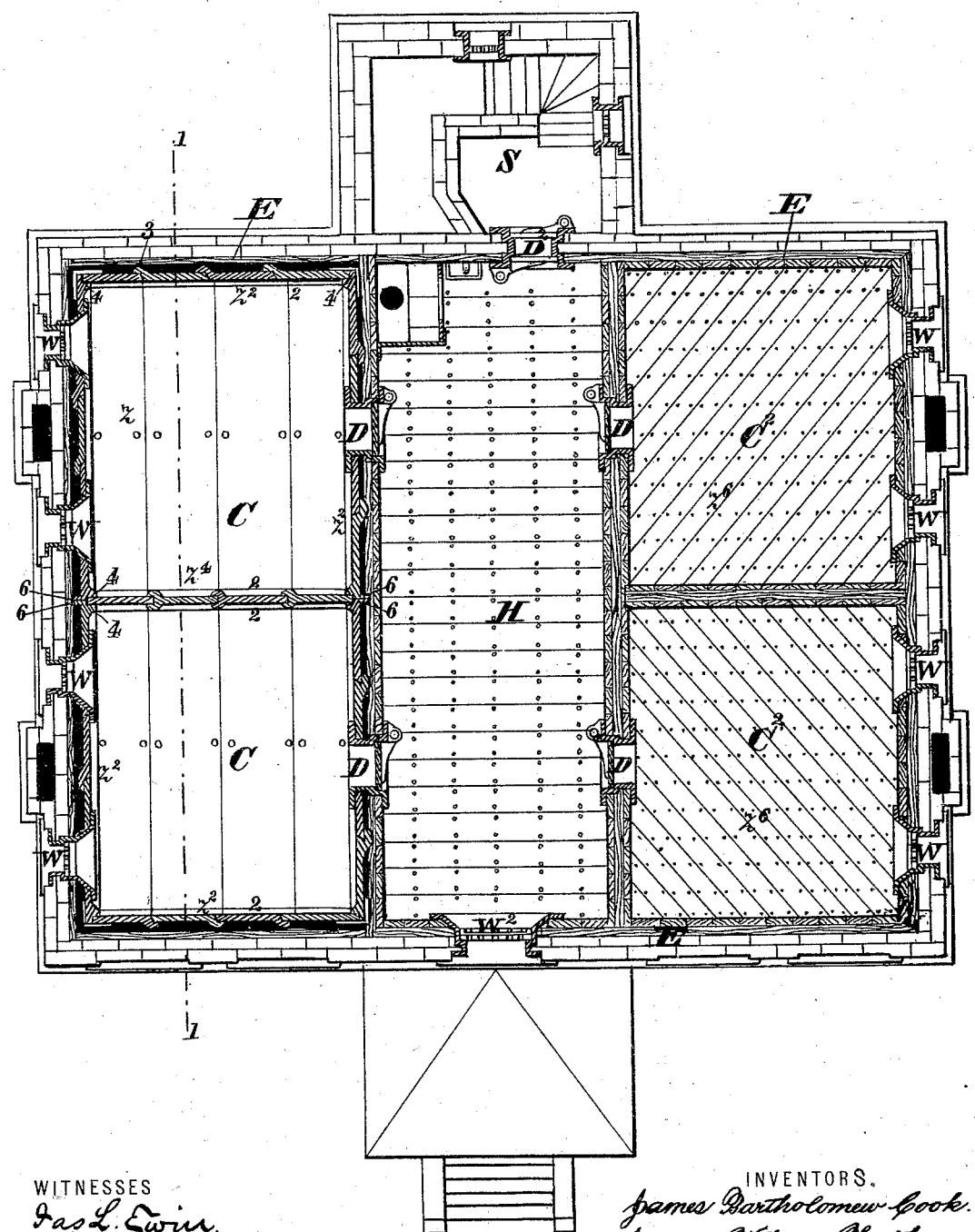

JAMES B. COOK AND JAMES W. HEATH, OF MEMPHIS, TENNESSEE.

IMPROVEMENT IN PRISONS.

Specification forming part of Letters Patent No. 154,021, dated August 11, 1874; application filed June 22, 1874.

*To all whom it may concern:*

Be it known that we, JAMES BARTHOLOMEW COOK and JAMES WILSON HEATH, both of the city of Memphis and county of Shelby, in the State of Tennessee, have invented a new and useful Improvement in the Construction of Prisons or Jails, of which the following is a specification:

The principal objects of this invention are economy and facility of construction, the absence of wrought-iron as a matter of security, and the ease with which the cells and appurtenances can be put together by the most ordinary workmen.

The invention consists, first, in making the lining of strong cells entirely of cast-iron plates, which form the top, bottom, and sides of each cell. These plates are united by lap or tongue-and-groove joints, so as to avoid, as much as possible, riveting or bolting the same together, and the metallic cell thus formed is supported externally by wooden bulkheading, and by the brick-work or stone-masonry of the external walls.

The invention consists, secondly, in window frames and sash, constructed of cast-iron in peculiar manner, each sash being held in position by grooves in the frame, and consisting of a single casting with geometrical perforations to admit light and air.

The invention consists, thirdly, in doors and door-frames of cast-iron, the former consisting of single castings with perforations formed therein in the process of manufacture, as herein set forth.

The invention consists, fourthly, in the method of constructing prisons or jails with strong cells, as above described, the iron-work being first put in position and then incased with wooden bulkheading, after which the brick or stone walls are built up against the bulkheading, the compound walls of the cells being thus built from within outwardly.

In the accompanying drawings, Figure 1 is a vertical longitudinal section, and Fig. 2 is a horizontal section of a small jail, illustrating this invention. Fig. 1 is taken on the line 1 1, Fig. 2, and Fig. 2 on the line 2 2, Fig. 1. Fig. 3 is an external elevation of a cell-window. Fig. 4 is a central vertical section of the same.

Fig. 5 is a horizontal section thereof. Fig. 6 is a horizontal section of a different cell-window. Fig. 7 is a horizontal section of a hall-window. Figs. 8 and 9 are horizontal sections of cell-doors. Figs. 10 to 15 are sections representing the details of the cast-iron cell-plates.

In the illustration, the improved jail is a two-story brick building. The first floor is occupied by dwelling or reception rooms R R, which may be fitted in any approved style. The stairway S is constructed within a central wing at the rear of the building. The cells C $C^2$ are located on the upper floor, on the respective sides of a central hall or corridor, H, extending longitudinally above the main-entrance hall. The strong cells, to which this invention relates primarily, are represented at C. The linings or inner walls of these cells consist of cast-iron floor, side, and ceiling plates $z$ $z^2$ $z^3$ and partition-plates $z^4$. The floor-plates $z$ are made, say, of one inch thick, two feet wide, and in length the width of the cells. The side plates $z^2$ and partition-plates $z^4$ are made one inch thick, two feet wide, and in length the height of the cells. The ceiling-plates $z^3$ are one inch thick, two feet wide, and in length the width of the cells, with longitudinal fish-ribs 1 on top to prevent sagging. The floor-plates are constructed with marginal flanges, 2, forming grooves to receive the side and partition plates. The side plates have thin ends, which rest in these grooves, and each plate has a longitudinal lip, 3, on one edge, to overlap the adjoining edge of the next plate on the outside. At the corners of the cells the side plates are constructed with internal flanges, 4, to close the same, and these flanges form side grooves to support the partition-plates $z^4$. The said plates are further constructed with suitable openings to receive the doors D and windows W, and their joints may be secured by means of bolts or rivets 5, as illustrated in Fig. 10. The said plates are still further constructed with external projecting flanges, 6, at the joints, coincident with the partitions, in order to provide for bolting the plates together at these points. The partition-plates $z^4$ have secure joints formed, without bolts or rivets, by a grooved longitudinal enlargement, 7, at one edge of each plate receiving the thin edge of the adjoining plate, as illustrated in Fig. 11. The ceiling-plates $z^3$ are constructed with internal flanges 8, forming grooves, or half-grooves, for the reception of the upper edges of the side and partition plates, and transverse external flanges, 9, at their ends, which adjoin at the partitions, for bolting them together at these points. The details of these plates are illustrated in Figs. 13, 14, and 15. The cell-windows W, Figs. 3 to 6, consist of cast-iron frames $y$ and cast-iron sash $x$. The window-frames $y$ are each cast in four parts—the sill 10, two side pieces or jambs 11. and a top piece or lintel, 12, as illustrated in Fig. 3. These are made to fit together with small grooves and flanges, and have external flanges or lugs to provide for bolting them together. Each sash $x$ is cast in one piece, of any required thickness, having geometrical perforations 13, of the required size, to admit light and air. The sash are held in grooves 14, formed in the parts of the window-frames, and are secured in position by bolting the parts of the frames together. A hall-window, $W^2$, Fig. 7, is constructed, in like manner, of a cast-iron frame, $y$, and a cast-iron sash, $x$, with an internal wooden frame, $w$, and glazed sash, $x^2$, as illustrated in Fig. 7. The doors D, Figs. 8 and 9, are composed of cast frames $v$ and cast doors $u$, the latter consisting each of a single casting, with hinge and lock projections on the outside, and with perforations or apertures 15, to admit air and light. They are also provided with the usual small doors or speaking apertures 16, Fig. 1. The hinges and locks may be of any approved pattern, and the frames may each consist of one or more castings.

The story or floor on which the cells are built consists of a solid tier of joists, J, of the proper depth, laid close together and made perfectly level on the surface. The iron floor-plates are set in position on these joists. The side plates and partitions are then erected, with the door-frames and windows in position. The ceiling-plates are then put on and bolted, and the whole is thus secured together. On the outside of the metallic cells thus constructed, a wooden bulk-heading, E, is built. This consists of solid timber-work of varying thickness, securely spiked. After the sides are built up the ceiling-plates are likewise bulkheaded, the corners being dovetailed together and all the joints well secured by spiking. The cells having thus been timbered up or inclosed with bulkheading, the outside walls L are continued up with brick or stone masonry, which is built around the window-frames, and the iron cells are thus built in and secured, first by the bulkheading and then by the masonry, the building progressing from the interior to the exterior, and not, as is usually the case, by first building the cells and then lining them with metal. In order to break out the iron-work of one of these cells, the wall on the outside must be torn down, then the bulkheading, and then the plates.

This method of constructing the cell is for a desperate class of prisoners. Cells for a less dangerous class are illustrated at $C^2$. These are lined with oak planking $z^6$, in two or more layers, crossed and spiked together with wrought spikes, as many to the square foot as may be necessary. The windows and doors of this last class of cells are preferably formed of the same pattern as those of the strong cells; and the same are peculiarly adapted and intended for the cells or the strong rooms of lunatic asylums, reformatories, and houses of refuge, and for police lockups, being cheap and perfectly secure, and capable of being made of any size and design to suit the building and its architecture. A window, W, as applied to a wood-lined cell, is illustrated in Fig. 6, and a door thus applied is illustrated in Fig. 9. The wooden lining is spiked on the sides and ceiling to the bulkheading E. The walls, floor, and ceiling of the upper hall or corridor H are lined in the same manner as the second class of cells, and its entrance is preferably guarded by a double door, $D^2$. The hall and other parts of the building may be otherwise constructed, and furnished in any approved style.

The wooden bulkheading adds very greatly to the strength and security of the walls, owing to the continuity of its structure, and the solidity of all the wood-work precludes danger from fire.

The joints of the cast-iron cell-lining do not depend on any rivets or other fastenings; and those bolts which are employed to unite the plates of adjoining cells are so situated as to be inaccessible by the most flexible and minute saws.

The windows and doors, wholly of cast-iron, are of very great importance. Escapes from prison are most frequently made by cutting the wrought-iron bars of the gratings, and the murder of keepers is most frequently accomplished by means of bars cut or wrested from the gratings. Iron doors and windows cast with orifices for the admission of air and light meet these objections in a perfect manner, possessing the peculiar advantages of hardness, to preclude cutting by ordinary means, rigidity to preclude bending, and homogenity to preclude displacement of parts, while they admit of infinite variety of design, so as to conform in external appearance with different architectural exteriors, and to give or withhold freedom of view. At the same time these doors and windows possess the advantages of superior cheapness, both in their manufacture and in their application.

Fastening iron cell-lining on the outside, and cast-iron cell plates and doors, broadly considered, are hereby disclaimed as old.

The following is claimed as new, namely:

1. A sash, $x$, for the windows of cells and other strong rooms, consisting of a single iron casting having small geometrical apertures or perforations in lieu of barred openings, for the admission of light and air, as herein shown and described, for the purpose set forth.

2. The cast-iron window, consisting of the sectional frame $y$ and the sash-casting $x$, held in a groove, 14, as specified, for the purpose named.

3. The combination of the solid floor of wooden joists J, the iron cells C, with inbuilt windows W, and doors D, and the wooden bulkheading E, and outer walls L of masonry, built up around and over the erected iron cells, to secure and support the latter, in the manner herein set forth,

JAMES B. COOK.
J. W. HEATH.

Witnesses:
J. C. ALSUP,
H. F. SCHULZ.